United States Patent [19]

Thomason

[11] 4,082,143
[45] Apr. 4, 1978

[54] SOLAR ENERGY

[76] Inventor: Harry E. Thomason, 609 Cedar Ave., Fort Washington, Md. 20022

[21] Appl. No.: 680,672

[22] Filed: Apr. 27, 1976

[51] Int. Cl.² .................................................. F28D 21/00
[52] U.S. Cl. .................................. 165/104 S; 62/438; 62/393; 126/271; 126/400; 237/1 A
[58] Field of Search ............... 165/104 S, DIG. 4; 126/400, 271; 237/19, 1 A; 62/438, 430, 393

[56] References Cited

U.S. PATENT DOCUMENTS

| 2,142,828 | 1/1939 | Smith | 62/438 X |
| 2,396,338 | 3/1946 | Newton | 165/DIG. 4 |
| 2,428,312 | 9/1947 | Herbener | 62/438 X |
| 3,754,398 | 8/1973 | Mattavi | 165/104 S X |
| 4,004,573 | 1/1977 | Frieling et al. | 237/1 A X |

Primary Examiner—Albert W. Davis, Jr.

[57] ABSTRACT

Simplicity is the height of invention. In the present invention, a plurality of containers provide for heat storage in water or other fluids, plus heat storage in heat-of-fusion heat storage material, plus domestic water heating, including good quality heat exchange going in to storage and going out to points of use. Additionally, the heat-of-fusion material acts as an insulator, to some extent, to reduce heat losses out of storage.

3 Claims, 1 Drawing Figure

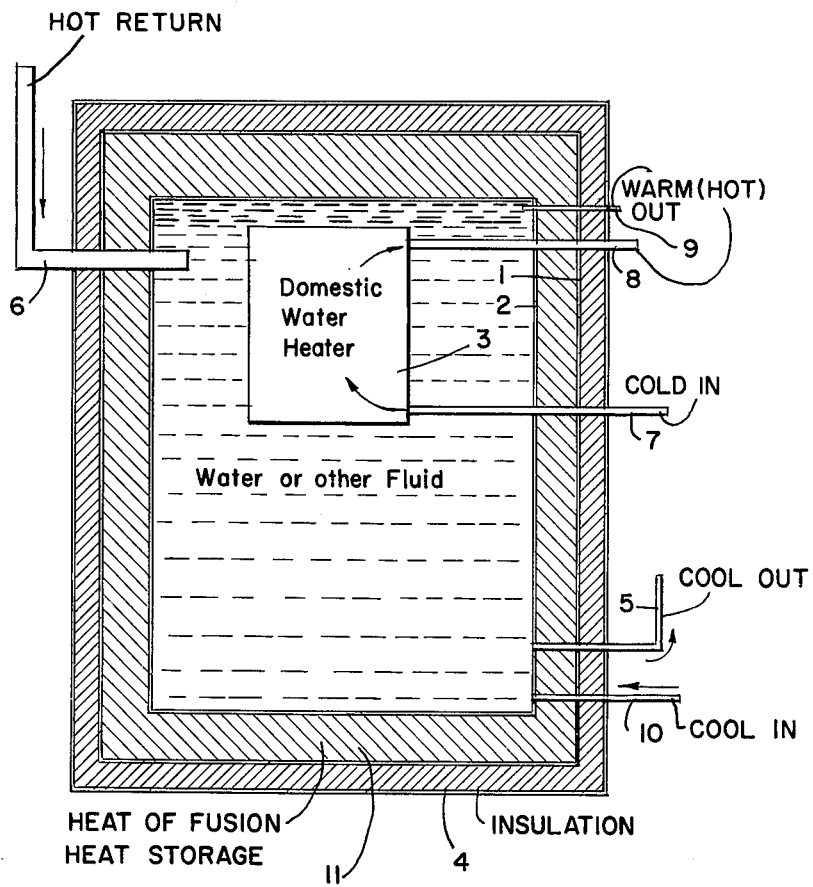

SOLAR ENERGY

BACKGROUND

For storage of solar-produced heat, and cold, a tank of water (or other liquid) surrounded by a truckload of stones has proven very effective, and low in cost, see Thomason U.S. Pat. Nos. 3,254,702; 3,254,703; 3,295,591; 3,236,294; 3,369,541; 3,412,728; 3,812,903 (other Patents Pending by Thomason and Thomason). Many solar home heating systems are in existence and being built using those inventions.

In many instances a home is already in existence that uses hot water for home heating. Virtually all homes have running hot domestic water. And, in many cases, new homes are being built with baseboard hot water heat or other types of hot water heat.

Many inventors fail to realize the importance of getting solar-produced heat in to storage quickly, at the lowest temperature possible. The fluid being heated in the solar collectors should give up its heat to storage quickly, so that the fluid can return to the collectors at low temperature. The low-temperature fluid, in turn, picks up more heat from the collectors. The collectors, in turn, operate at lower temperatures. Operating at lower temperatures, they are more efficient and obtain more free heat from the sun. The present invention gets the heat from the sun in to storage rapidly and efficiently.

Many apartment houses, office buildings, warehouses, factories, etc. use large quantities of warm or hot water for heating, processing, domestic purposes, etc. And, there are many other applications requiring warm or hot water.

Electricity to produce heat can be obtained at half-price in many areas. In other cases, off-peak energy is available to produce heat at low cost, if it can be stored for use later.

So, there is a need for warm and hot water, not only on sunny days but, by stored heat, on nights and cloudy days. Much of that need is for both Summer and Winter, plus Autumn and Springtime, that is, 365 days a year. The present invention fills that need, at low cost.

IN THE DRAWING

The single FIGURE illustrates an embodiment of the invention.

An outer container 1 has a second container 2 therein with a third container 3 inside of container 2. Insulation 4 preferably substantially surrounds the containers.

Cool water (or other fluid) from near the bottom of container 2 flows to a source of heat through conduit 5. Such source of heat may be a solar heat collector, or other heat-producing apparatus. Warm or hot water returns at 6.

Cold water to be heated (such as city or well water) flows in at 7 to container 3. Warm or hot water in container 2 heats the water in container 3. The warmed water flows out at 8 to a point of usage. Or, it flows through an auxiliary heater to make it always hot, irrespective of heat input at 6 into container 2. That hot water is usually for domestic purposes.

If warm or hot water is needed for other purposes it flows out at 9 and returns at 10 to container 2. Typically warm water flowing out at 9 will flow through baseboard or fan coil heaters or such, to warm a building. After its heat is removed it will flow back at 10 as cool water. Or, if the warm or hot water is used up, or consumed, as it flows out at 9, it will be replaced by cold makeup water coming in at 10.

Heat-of-fusion heat storage material is illustrated at 11.

No insulation is perfect. So, some heat will leak out through insulation 4. But, that level loss can be reduced by placing heat-of-fusion heat storage material 11 in container 1 and substantially surrounding container 2. Also, very large quantities of heat can be stored in the heat-of-fusion material itself. So, as heat is used from container 3, replacement heat will flow from the warm or hot fluid in container 2 to the fluid in container 3. That leaves the fluid cooler in container 2. Then, heat from material 11 heats the fluid in container 2.

It will be noted that heated fluid coming in to storage at 6 flows into the space between two containers 2 and 3. Therefore, the heat flows quickly in two directions, in to the fluid in container 3 and outward to the heat-of-fusion material 11 in container 1. Those two containers have large surface areas of contact with the heated fluid, thereby speeding up the heat-transfer process. So, quickly the heat is imparted, in both directions, to storage. The heated fluid cools down and returns by outlet 5 to the solar collectors, or other source of heat, for re-heating. That cooled fluid picks up more heat, more efficiently, from the solar collectors or other source of heat.

This invention provides many good features. The containers are low in cost to fabricate. The heat-of-fusion material is fairly low in cost. Heat transfer is entirely automatic, flowing both into and out of storage. Large quantities of heat are transferred without additional heat exchangers. That is because of the large surfaces of the containers, and because each is "bathed" in warm or hot material.

Heat loss from storage is reduced. As the fluid is being heated hour-by-hour in container 2, its heat flows into material 11 which "soaks up" very large quantities of heat and, therefore, warms up ever-so-slowly. As a result, hours pass before high temperature heat is attempting to pass through insulation 4. Consequently, heat storage material 11 acts somewhat as an insulator, to reduce heat losses from storage.

The "insulating" effect of material 11 is not particularly damaging as heat is recovered from storage material 11. Typically, solar energy heats the material during only 6 to 8 hours of sunshine. Recovery is during a period of 16 hours or more (nights and cloudy days). Therefore, there is plenty of time for the heat to make its way back out of storage material 11 into containers 2 and 3 from which it is being used.

A large quantity of already-heated water is available in container 3 for ready usage for baths, washing clothes, etc. That reserve eliminates the need for expensive large-area heat exchangers. And yet, the large surface area of container 3 causes relatively quick heating of cold water that flows thereinto as hot water is drawn therefrom.

A large quantity of already-heated fluid is available in container 2 for ready usage. It may be used to heat a home or other building, or to heat cold city water coming into container 3.

A large quantity of heat is available from material 11 because of its high capacity during its change of phase. That large quantity of heat is available to replenish heat used from inner container 2 or innermost container 3. (Of course, the sensible heat from heat-of-fusion storage material 11 is also available to container 2 or container 3 or both.)

Although heat storage and recovery from storage is the primary thrust of the present invention it is obvious that cold storage could be obtained in similar apparatus. The particular heat-of-fusion material 11 would melt and thaw at a temperature commensurate with the cold storage temperature level. Perhaps "ice-water" would be needed, chilled in container 3. Coldness for storage could be produced during cool periods of the night. During off-peak periods electric power rates are low. Also, cooling can be accomplished with less electricity for the refrigerating apparatus during cool night hours.

For heat storage, a melting temperature of-the-order-of 110° to 120° F. may be used for material 11 for many purposes. For cold storage a melting/freezing temperature of-the-order-of 40° to 50° F. may be used for many purposes. So, we have simple, low-cost heat and cold storage apparatus.

I claim:

1. Heat or cold storage apparatus comprising a first outer container, a second container in said first container, a third tank-like container in said second container, insulation means to reduce heat or cold transfer into or out from said first outer container, heat-of-fusion heat storage material substantially filling the space between said first and said second containers, conduit means connected to said third container to introduce liquid to be heated or cooled and to provide for exit of such liquid, and conduit means connected to said second container to provide for: A. introduction of liquid and exit of liquid for heat or cold storage purposes; and B. exit of and return of liquid for removal of heat or cold from storage.

2. Apparatus as in claim 1 wherein said heat-of-fusion heat storage material comprises a material with a melting temperature of about 110° to 120° F.

3. Apparatus as in claim 1 wherein said heat-of-fusion heat/cold storage material comprises a material with a melting/freezing temperature of about 40° to 50° F.

* * * * *